US 11,601,861 B2

(12) United States Patent
Hong

(10) Patent No.: US 11,601,861 B2
(45) Date of Patent: Mar. 7, 2023

(54) UNMANNED AERIAL VEHICLE CONTROL METHOD AND APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 310 days.

(21) Appl. No.: 16/759,466

(22) PCT Filed: Nov. 2, 2017

(86) PCT No.: PCT/CN2017/109140
§ 371 (c)(1),
(2) Date: Apr. 27, 2020

(87) PCT Pub. No.: WO2019/084872
PCT Pub. Date: May 9, 2019

(65) Prior Publication Data
US 2020/0344661 A1 Oct. 29, 2020

(51) Int. Cl.
*H04W 36/32* (2009.01)
*B64C 39/02* (2023.01)
(Continued)

(52) U.S. Cl.
CPC .......... *H04W 36/32* (2013.01); *B64C 39/024* (2013.01); *G05D 1/0016* (2013.01); *G05D 1/101* (2013.01);
(Continued)

(58) Field of Classification Search
CPC ............ B64C 39/024; B64C 2201/146; G05D 1/0016; G05D 1/101; G05D 1/0022;
(Continued)

(56) References Cited

U.S. PATENT DOCUMENTS

2005/0094851 A1    5/2005  Bodin et al.
2012/0320791 A1*  12/2012  Guo ............... H04W 52/0212
                                                          370/254
(Continued)

FOREIGN PATENT DOCUMENTS

CN    103249000 A    8/2013
CN    103974327 A    8/2014
(Continued)

OTHER PUBLICATIONS

Nokia et al., "Potential mobility enhancements for UAVs", R2-1708667, 3GPP TSG-RAN WG2 #99 Berlin, Germany, Aug. 21-25, 2017. (Year: 2017).*

(Continued)

*Primary Examiner* — Khoa Huynh
(74) *Attorney, Agent, or Firm* — Finnegan, Henderson, Farabow, Garrett & Dunner, L.L.P.

(57) ABSTRACT

A method and apparatus for controlling a UAV are provided. The method is applied to a base station, and includes: receiving flight path information transmitted by a UAV controller, wherein the flight path information represents a flight path set by the UAV controller for a UAV controlled by the UAV controller; determining the flight path based on the flight path information; and determining a next base station to which the UAV is to move based on the flight path, and performing a handover preparation for the next base station. Therefore, the present disclosure improves the mobility of the UAV and can also reduce the latency of handover between base stations.

6 Claims, 9 Drawing Sheets

Receive flight path information transmitted by a UAV controller, wherein the flight path information represents a flight path set by the UAV controller for a UAV controlled by the UAV controller — 110

Determine the flight path set by the UAV controller for the controlled UAV according to the flight path information — 120

Determine a next base station to which the UAV is to move according to the flight path, and perform a handover preparation for the next base station — 130

Transmit the flight path information to at least one adjacent base station corresponding to the base station, such that the at least one adjacent base station determines itself as a base station to which the UAV is to move according to the flight path information, then determines another next base station to which the UAV is to move according to the flight path information, and performs a handover preparation for another next base station — 510

(51) Int. Cl.

| | |
|---|---|
| *G05D 1/00* | (2006.01) |
| *G05D 1/10* | (2006.01) |
| *G08G 5/00* | (2006.01) |
| *H04W 36/00* | (2009.01) |
| *H04W 36/08* | (2009.01) |
| *H04W 36/38* | (2009.01) |
| *H04W 92/20* | (2009.01) |

(52) U.S. Cl.
CPC ........ *G08G 5/003* (2013.01); *H04W 36/0016* (2013.01); *H04W 36/08* (2013.01); *H04W 36/38* (2013.01); *B64C 2201/146* (2013.01); *H04W 92/20* (2013.01)

(58) Field of Classification Search
CPC .... G08G 5/003; G08G 5/0026; G08G 5/0034; G08G 5/0013; G08G 5/0069; H04W 36/32; H04W 36/0016; H04W 36/08; H04W 36/38; H04W 92/20; H04W 36/00835
See application file for complete search history.

(56) References Cited

U.S. PATENT DOCUMENTS

| | | | | |
|---|---|---|---|---|
| 2017/0237607 | A1* | 8/2017 | Smith | H04L 67/104 709/223 |
| 2020/0077415 | A1* | 3/2020 | Tang | G08G 5/0069 |
| 2020/0169936 | A1* | 5/2020 | Han | H04W 36/0038 |
| 2020/0236602 | A1* | 7/2020 | Mahkonen | H04B 7/18504 |

FOREIGN PATENT DOCUMENTS

| | | |
|---|---|---|
| CN | 104053197 A | 9/2014 |
| CN | 105007115 A | 10/2015 |
| CN | 106688272 A | 5/2017 |
| CN | 106921939 A | 7/2017 |
| CN | 107204130 A | 9/2017 |
| CN | 108064360 A | 5/2018 |

OTHER PUBLICATIONS

International Search Report of PCT Application No. PCT/CN2017/109140 from the State Intellectual Property Office of the P.R. China, dated Jul. 23, 2018.

State Intellectual Property Office of the People's Republic of China, Office Action and Search Report Issued in Application No. 201780001830.8, dated Mar. 2, 2021, 32 pages.

Nokia, Nokia Shanghai Bell, "Potential mobility enhancements for UAVs", 3GPP TSG-RAN WG2 #99bis, Prague, Czech Republic, R2-1711445, Resubmission of R2-1708667, Oct. 9-13, 2017, 2 pages.

State Intellectual Property Office of the People's Republic of China, Office Action and Search Report Issued in Application No. 201780001830.8, dated Aug. 9, 2021, 45 pages.

State Intellectual Property Office of the People's Republic of China, Office Action and Search Report Issued in Application No. 2017800018308, dated May 7, 2020, 34 pages.

Lenovo, Motorola Mobility, "Consideration for potential mobility enhancement for aerial UE", R2-1711377, Revision of R2-1708975, 3GPP TSG-RAN WG2 Meeting#99bis, Prague, Czech, Oct. 9-13, 2017, 6 pages.

ISA State Intellectual Property Office of the People's Republic of China, Written Opinion of the International Searching Authority Issued in Application No. PCT/CN2017/109140, dated Jul. 23, 2018, WIPO, 9 pages.

\* cited by examiner

UNMANNED AERIAL VEHICLE CONTROL METHOD AND APPARATUS

CROSS REFERENCE TO RELATED APPLICATIONS

This application is a national phase application based on PCT/CN2017/109140, filed Nov. 2, 2017, the content of which is incorporated herein by reference.

TECHNICAL FIELD

The present disclosure relates to the field of communication technology, and in particular, to an unmanned aerial vehicle control method and apparatus.

BACKGROUND

Pilotless aircraft, also referred to as unmanned aerial vehicle (UAV), is an unmanned aircraft operated using a radio remote control device and a self-provided program control apparatus.

With the continuous development of UAV technology, the UAV has been widely used. In related technologies, in order to further expand the application range of the UAV, cellular networks need to provide services that meet demands for the UAV. However, the existing cellular networks have no technical solution for controlling the UAV.

SUMMARY

In order to overcome the problems existing in the related art, examples of the present disclosure provide a UAV control method and apparatus.

According to a first aspect of the examples of the present disclosure, there is provided a method of controlling a UAV. The method is applied to a base station, and includes:

receiving flight path information transmitted by a UAV controller, wherein the flight path information represents a flight path set by the UAV controller for a UAV controlled by the UAV controller;

determining the flight path based on the flight path information;

determining a next base station to which the UAV is to move based on the flight path, and performing a handover preparation for the next base station.

Optionally, the flight path information further includes an identifier of the UAV controlled by the UAV controller.

Optionally, receiving the flight path information transmitted by the UAV controller includes:

receiving a first Radio Resource Control (RRC) signaling transmitted by the UAV controller, wherein the first RRC signaling includes the flight path information;

acquiring the flight path information from the first RRC signaling.

Optionally, receiving the flight path information transmitted by the UAV controller includes:

receiving a second RRC signaling transmitted by the UAV controlled by the UAV controller, wherein the second RRC signaling includes the flight path information;

acquiring the flight path information from the second RRC signaling.

Optionally, the method further includes:

transmitting the flight path information to at least one adjacent base station corresponding to the base station, such that the at least one adjacent base station determines itself as a base station to which the UAV is to move based on the flight path information, then determines another next base station to which the UAV is to move based on the flight path information, and performs a handover preparation for the another next base station.

Optionally, transmitting the flight path information to the at least one adjacent base station corresponding to the base station includes:

transmitting the flight path information to the at least one adjacent base station through an X2 interface.

According to a second aspect of the examples of the present disclosure, there is provided a method of controlling a UAV. The method is applied to a UAV controller, and includes:

setting flight path information, wherein the flight path information represents a flight path set by the UAV controller for the UAV controlled by the UAV controller;

transmitting the flight path information to a base station that provides a network service for the controlled UAV, such that the base station determines the flight path based on the flight path information.

Optionally, the flight path information further includes an identifier of the UAV controlled by the UAV controller.

Optionally, transmitting the flight path information to the base station includes:

transmitting the flight path information to the controlled UAV, and transmitting, by the controlled UAV, the flight path information to the base station.

Optionally, transmitting the flight path information to the base station includes:

transmitting the flight path information to the base station through a RRC signaling.

According to a third aspect of the examples of the present disclosure, there is provided a method of controlling a UAV. The method is applied to the UAV, and includes:

receiving flight path information transmitted by a UAV controller, wherein the flight path information represents a flight path set by the UAV controller for the UAV controlled by the UAV controller;

transmitting the flight path information to a base station that provides a network service for the UAV, such that the base station determines the flight path based on the flight path information.

Optionally, the flight path information further includes an identifier of the UAV controlled by the UAV controller.

Optionally, transmitting the flight path information to the base station that provides the network service for the UAV includes:

adding the flight path information to a RRC signaling;
transmitting the RRC signaling with the flight path information to the base station, such that the base station acquires the flight path information from the RRC signaling.

According to a fourth aspect of the examples of the present disclosure, there is provided an apparatus for controlling a UAV. The apparatus is applied to a base station, and includes:

a base station reception module configured to receive flight path information transmitted by a UAV controller, wherein the flight path information represents a flight path set by the UAV controller for the UAV controlled by the UAV controller;

a first determination module configured to determine the flight path based on the flight path information;

a second determination module configured to determine a next base station to which the UAV is to move based on the flight path, and perform a handover preparation for the next base station.

Optionally, the flight path information further includes an identifier of the UAV controlled by the UAV controller.

Optionally, the base station reception module includes:

a first reception sub-module configured to receive a first RRC signaling transmitted by the UAV controller, wherein the first RRC signaling includes the flight path information;

a first acquisition sub-module configured to acquire the flight path information from the first RRC signaling.

Optionally, the base station reception module includes:

a second reception sub-module configured to receive a second RRC signaling transmitted by the UAV controlled by the UAV controller, wherein the second RRC signaling includes the flight path information;

a second acquisition sub-module configured to acquire the flight path information from the second RRC signaling.

Optionally, the apparatus further includes:

a base station transmission module configured to transmit the flight path information to at least one adjacent base station corresponding to the base station, such that the at least one adjacent base station determines itself as a base station to which the UAV is to move based on the flight path information, then determines another next base station to which the UAV is to move based on the flight path information, and performs a handover preparation for the another next base station.

Optionally, the base station transmission module includes:

a transmission sub-module configured to transmit the flight path information to the at least one adjacent base station through an X2 interface.

According to a fifth aspect of the examples of the present disclosure, there is provided an apparatus for controlling a UAV. The apparatus is applied to a UAV controller, and includes:

a setting module configured to set flight path information, wherein the flight path information represents a flight path set by the UAV controller for the UAV controlled by the UAV controller;

a controller transmission module configured to transmit the flight path information to a base station that provides a network service for the controlled UAV, such that the base station determines the flight path based on the flight path information.

Optionally, the flight path information further includes an identifier of the UAV controlled by the UAV controller.

Optionally, the controller transmission module includes:

a first transmission sub-module configured to transmit the flight path information to the controlled UAV, and transmit, by the controlled UAV, the flight path information to the base station.

Optionally, the controller transmission module or the first transmission sub-module includes:

a second transmission sub-module configured to transmit the flight path information to the base station through a RRC signaling.

According to a sixth aspect of the examples of the present disclosure, there is provided an apparatus for controlling a UAV. The apparatus is applied to the UAV, and includes:

a UAV reception module configured to receive flight path information transmitted by a UAV controller, wherein the flight path information represents a flight path set by the UAV controller for the UAV controlled by the UAV controller;

a UAV transmission module configured to transmit the flight path information to a base station that provides a network service for the UAV, such that the base station determines the flight path based on the flight path information.

Optionally, the flight path information further includes an identifier of the UAV controlled by the UAV controller.

Optionally, the UAV transmission module includes:

an addition sub-module configured to add the flight path information to a RRC signaling;

a third transmission sub-module configured to transmit the RRC signaling with the flight path information to the base station, such that the base station acquires the flight path information from the RRC signaling.

According to a seventh aspect of the examples of the present disclosure, there is provided a non-transitory computer readable storage medium having a computer program stored thereon, wherein the computer program is configured to execute the method of controlling the UAV according to the first aspect.

According to an eighth aspect of the examples of the present disclosure, there is provided a non-transitory computer readable storage medium having a computer program stored thereon, wherein the computer program is configured to execute the method of controlling the UAV according to the second aspect.

According to a ninth aspect of the examples of the present disclosure, there is provided a non-transitory computer readable storage medium having a computer program stored thereon, wherein the computer program is configured to execute the method of controlling the UAV according to the third aspect.

According to a tenth aspect of the examples of the present disclosure, there is provided an apparatus for controlling a UAV. The apparatus is applied to a UAV base station, and includes:

a processor; and a memory for storing processor executable instructions, wherein the processor is configured to:

receive flight path information transmitted by a UAV controller, wherein the flight path information represents a flight path set by the UAV controller for the UAV controlled by the UAV controller;

determine the flight path based on the flight path information;

determine a next base station to which the UAV is to move based on the flight path, and perform a handover preparation for the next base station.

According to an eleventh aspect of the examples of the present disclosure, there is provided an apparatus for controlling a UAV. The apparatus is applied to a UAV controller, and includes:

a processor;

a memory for storing processor executable instructions, wherein the processor is configured to:

set flight path information, wherein the flight path information represents a flight path set by the UAV controller for the UAV controlled by the UAV controller;

transmit the flight path information to a base station that provides a network service for the controlled UAV, such that the base station determines the flight path based on the flight path information.

According to a twelfth aspect of the examples of the present disclosure, there is provided an apparatus for controlling a UAV. The apparatus is applied to the UAV, and includes:

a processor;

a memory for storing processor executable instructions, wherein the processor is configured to:

receive flight path information transmitted by a UAV controller, wherein the flight path information represents a flight path set by the UAV controller for the UAV controlled by the UAV controller;

transmit the flight path information to a base station that provides a network service for the UAV, such that the base station determines the flight path based on the flight path information.

The technical solutions provided by the examples of the present disclosure may include the following beneficial effects:

The base station in the present disclosure may receive the flight path information transmitted by the UAV controller, determine the flight path set by the UAV controller for the controlled UAV based on the flight path information, determine the next base station to which the UAV will move based on the flight path, and perform the handover preparation for the next base station, thereby improving the mobility of the UAV and further reducing the latency of handover between base stations.

The UAV controller in the present disclosure may set the flight path information, wherein the flight path information represents the flight path set by the UAV controller for the controlled UAV, and transmit the flight path information to a base station that provides the network service for the controlled UAV, so that the base station may determine the flight path of the UAV based on the flight path information, further determine the next base station to which the UAV is to move based on the flight path, and perform the handover preparation for the next base station, thereby improving the mobility of the UAV and further reducing the latency of handover between base stations.

The UAV in this disclosure may receive the flight path information transmitted by the UAV controller, and transmit the flight path information to the base station that provides the network service for the UAV, so that the base station determines the flight path based on the flight path information, further determines the next base station to which the UAV is to move based on the flight path, and performs the handover preparation for the next base station, thereby improving the mobility of the UAV and further reducing the latency of handover between base stations.

It should be understood that the above general description and the following detailed description are only exemplary and explanatory but are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
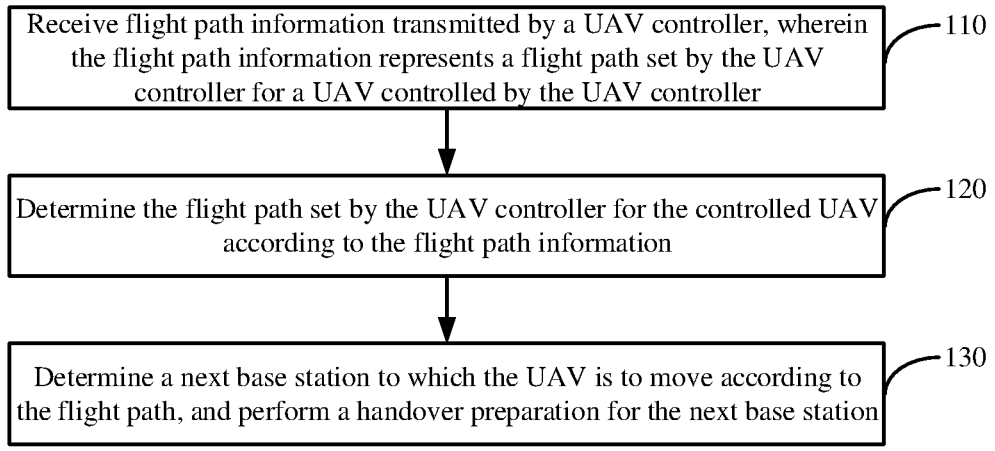
FIG. 1 is a flow chart illustrating a method of controlling a UAV according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 2A:
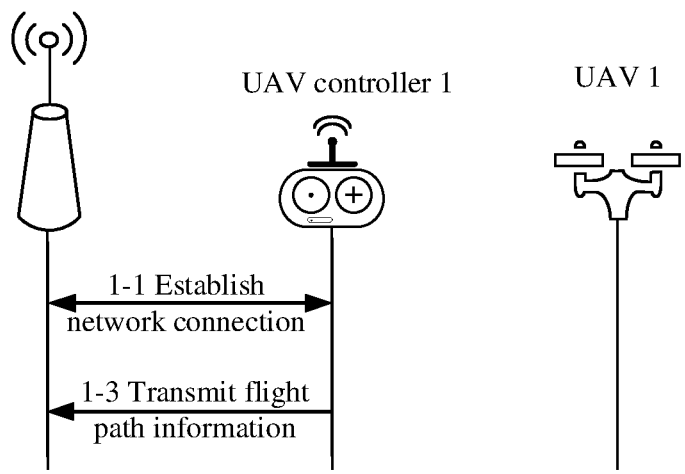
FIG. 2A is a scenario diagram illustrating a method of controlling a UAV according to an example of the present disclosure.
Figure 2B:
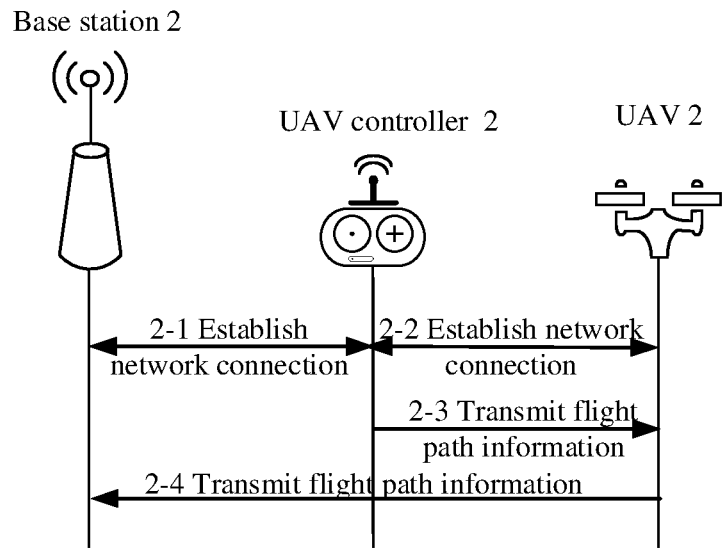
FIG. 2B is another scenario diagram illustrating a method of controlling a UAV according to an example of the present disclosure.

FIG. 1 is a flow chart illustrating a method of controlling a UAV according to an example of the present disclosure. FIG. 2A is a scenario diagram illustrating a method of controlling a UAV according to an example of the present disclosure. FIG. 2B is another scenario diagram illustrating a method of controlling a UAV according to an example of the present disclosure. The method of controlling the UAV may be applied to a base station, which is a base station that provides a network service for a UAV controlled by a UAV controller. As shown in FIG. 1, the method of controlling the UAV may include the following steps 110-130.

At step 110, flight path information transmitted by a UAV controller is received. The flight path information represents a flight path set by the UAV controller for a UAV controlled by the UAV controller.

In some examples of the present disclosure, the UAV is a cellular network UAV. That is, the UAV is capable of receiving services provided by a cellular network.

There are generally two modes for the flight of UAV. One is a static mode. In this mode, when an operator plans a flight path for a UAV on a UAV controller, the UAV may fly according to a planned flight path, and the UAV controller does not control the UAV at all times. The other is a dynamic mode. In this mode, the operator will control the UAV through the UAV controller in real time.

In the static mode, since the flight path of the UAV is stationary, the UAV controller may transmit the flight path information in advance to a base station that currently serves the UAV, and the flight path information represents a flight path set by the UAV controller for the controlled UAV. Therefore, the base station that currently serves the UAV may pre-determine which base stations the UAV will pass according to the flight path information transmitted by the UAV controller.

At step 120, the flight path set by the UAV controller for the controlled UAV is determined according to the flight path information.

At step 130, a next base station to which the UAV is to move is determined according to the flight path, and a handover preparation is performed for the next base station.

In the above examples of the present disclosure, after the current base station obtains in advance which cellular network base stations the UAV will pass according to the flight path information transmitted by the UAV controller, the current base station may prepare for base station handover in advance.

In an example scenario, as shown in FIG. 2A, a base station 1, a UAV controller 1, and a UAV 1 are included. The base station 1 is a base station that provides a network service for the UAV 1. The UAV controller 1 is a controller for controlling the UAV 1 such as the flight direction, flight height, flight speed, and flight mode of the UAV 1.

After the UAV controller 1 establishes a network connection with the base station 1, and sets the flight path information for the UAV 1, the UAV controller 1 will directly transmit the flight path information to the base station 1, so that the base station 1 may pre-determine which base stations the UAV 1 will pass according to the flight path information transmitted by the UAV controller 1. The UAV controller 1 may transmit the flight path information to the base station 1 through a cellular network.

In another example scenario, as shown in FIG. 2B, a base station 2, a UAV controller 2, and a UAV 2 are included. The base station 2 is a base station that provides a network service for the UAV 2. The UAV controller 2 is a controller for controlling the UAV 2 such as the flight direction, flight height, flight speed, and flight mode of the UAV 2.

After the UAV controller 2 establishes a network connection with the base station 2 and the UAV 2, and sets the flight path information for the UAV 2, the UAV controller 2 will transmit the flight path information to the UAV 2, and then the UAV 2 transmits the flight path information to the base station 2, so that the base station 2 may pre-determine which base stations the UAV 2 will pass according to the flight path information transmitted by the UAV 2. The UAV controller 2 may transmit the flight path information to the UAV 2 through a cellular network or other networks such as a WIFI (Wireless Fidelity) network.

In the above example, the flight path information transmitted by the UAV controller is received, the flight path set by the UAV controller for the controlled UAV is determined according to the flight path information, the next base station to which the UAV is to move is determined according to the flight path, and the handover preparation for the next base station are performed. As a result, the mobility of the UAV is improved and further the latency of handover between base stations is reduced.

In an example, the flight path information at the step 110 may further include an identifier of the UAV controlled by the UAV controller.

In the above example, when the flight path information further includes the identifier of the UAV controlled by the UAV controller, the base station may directly obtain, from the flight path information, which UAV the flight path is directed to, and which base stations the UAV may pass, thereby improving the speed at which the base station acquires the flight path of the UAV, and increasing the control efficiency of the UAV.

Figure 3:
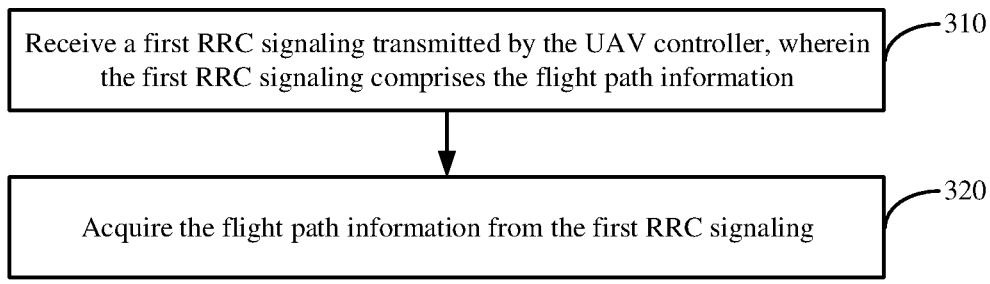
FIG. 3 is a flow chart illustrating another method of controlling a UAV according to an example of the present disclosure.

FIG. 3 is a flow chart illustrating another method of controlling a UAV according to an example of the present disclosure. The method of controlling the UAV may be applied to a base station. On the basis of the method shown in FIG. 1, when performing the step 110, the method may include the following steps 310-320 shown in FIG. 3.

At step 310, a first Radio Resource Control (RRC) signaling transmitted by the UAV controller is received. The first RRC signaling includes the flight path information.

In the above examples of the present disclosure, the first RRC signaling may be a communication manner between the UAV controller and the base station, for example, the first RRC signaling includes User Equipment Assistance Information.

At step 320, the flight path information is acquired from the first RRC signaling.

In the above example, by receiving the first RRC signaling transmitted by the UAV controller, and acquiring the flight path information from the first RRC signaling, the base station determines the next base station to which the UAV is to move according to the flight path information, and performs the handover preparation for the next base station, thereby improving the mobility of the UAV and further reducing the latency of handover between base stations.

Figure 4:
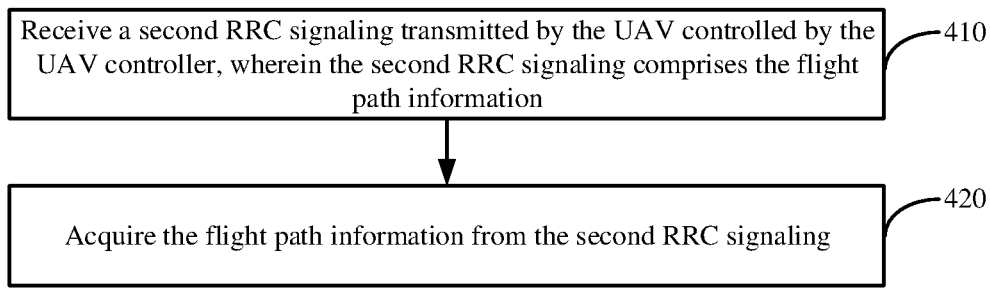
FIG. 4 is a flow chart illustrating another method of controlling a UAV according to an example of the present disclosure.

FIG. 4 is a flow chart illustrating another method of controlling a UAV according to an example of the present disclosure. The method of controlling the UAV may be applied to a base station. On the basis of the method shown in FIG. 1, when performing the step 110, the method may include the following steps 410-420 shown in FIG. 4.

At step 410, a second RRC signaling transmitted by the UAV controlled by the UAV controller is received. The second RRC signaling includes the flight path information.

In the above example of the present disclosure, the second RRC signaling may be a communication manner between the UAV and the base station, for example, User Equipment Assistance Information.

At step 420, the flight path information is acquired from the second RRC signaling.

In the above example, by receiving the second RRC signaling from the UAV controlled by the UAV controller, and acquiring the flight path information from the second RRC signaling, the base station determines the next base station to which the UAV is to move according to the flight path information, and performs the handover preparation for the next base station, thereby improving the mobility of the UAV and further reducing the latency of handover between base stations.

Figure 5:
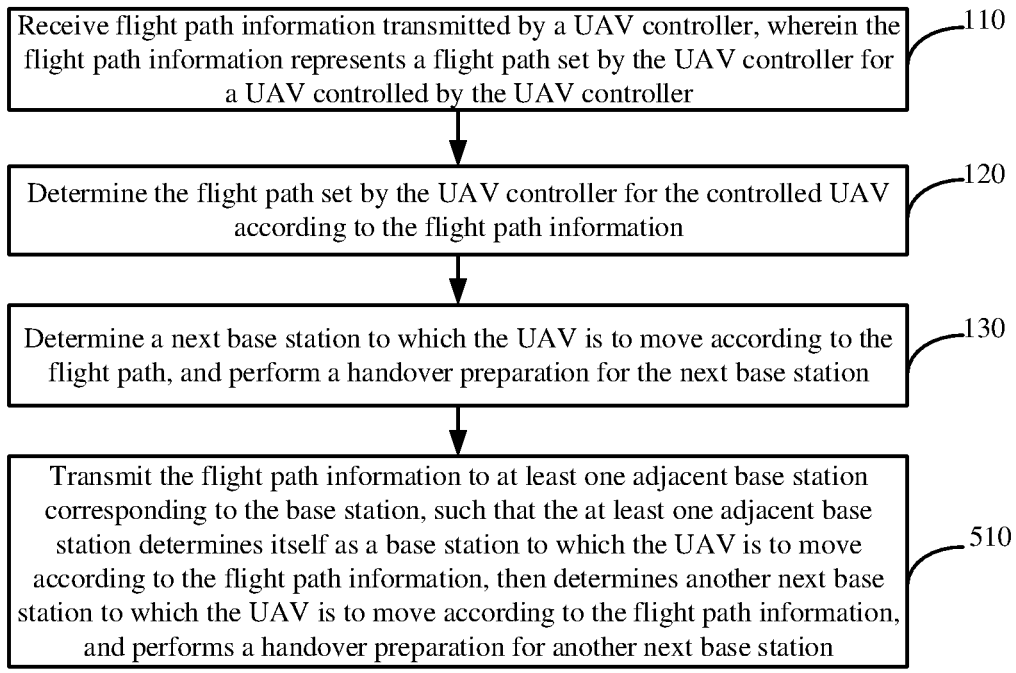
FIG. 5 is a flow chart illustrating another method of controlling a UAV according to an example of the present disclosure.

FIG. 5 is a flow chart illustrating another method of controlling a UAV according to an example of the present disclosure. The method of controlling the UAV may be applied to a base station. On the basis of the method shown in FIG. 1, when performing the step 130, the method of controlling the UAV may include the following step 510 shown in FIG. 5.

At step 510, the flight path information is transmitted to at least one adjacent base station corresponding to the base station, such that the at least one adjacent base station determines itself as a base station to which the UAV is to move according to the flight path information, then determines another next base station to which the UAV is to move according to the flight path information, and performs a handover preparation for another next base station. The flight path information may further include an identifier of the UAV controlled by the UAV controller.

In the above example of the present disclosure, after the at least one adjacent base station receives the flight path information, the at least one adjacent base station may obtain which base station the UAV will pass according to the flight path information, and when determining that the at least one adjacent base station itself is the base station to which the UAV is to move, the at least one adjacent base station may determine another next station to which the UAV is to move according to the flight path information, and perform the preparation on handover for another next base station in advance.

In the above example, by transmitting the flight path information to the at least one adjacent base station corresponding to the base station, the base stations which the UAV is to pass through may perform preparation for base station handover in advance, thereby improving the mobility of the UAV and further reducing the latency of base station handover.

In an example, the step 510 may adopt, but is not limited to, the following manner:

transmitting the flight path information to the at least one adjacent base station corresponding to the base station via an X2 interface.

In the above example of the present disclosure, the X2 interface is an interconnection interface between base stations, and supports direct transmission of data and signaling.

In the above example, by transmitting the flight path information to the at least one adjacent base station corresponding to the base station via the X2 interface, the efficiency of information transmission is improved.

Figure 6:
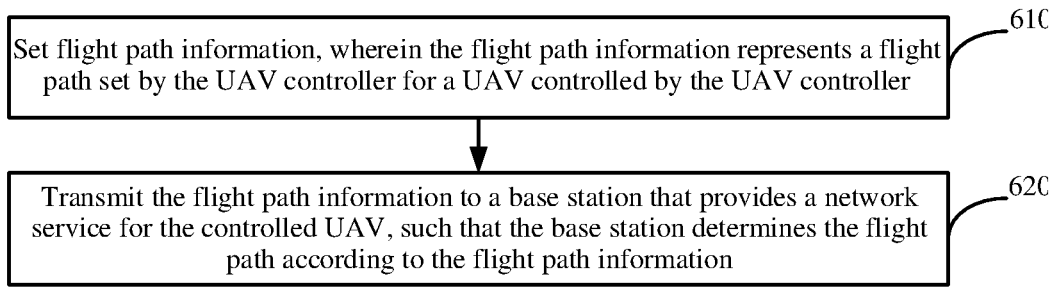
FIG. 6 is a flow chart illustrating a method of controlling a UAV according to an example of the present disclosure.

FIG. 6 is a flow chart illustrating a method of controlling a UAV according to an example of the present disclosure. The method of controlling the UAV may be applied to a UAV controller. The UAV controller is a controller for controlling the UAV such as the flight direction, flight height, flight speed, and flight mode of the UAV. The method of controlling the UAV may include the following steps 610-620 shown in FIG. 6.

At step 610, flight path information is set, wherein the flight path information represents a flight path set by the UAV controller for a UAV controlled by the UAV controller.

In the above example of the present disclosure, the UAV controller may set the flight path for the controlled UAV, and may transmit the flight path information represented the flight path to a base station that provides a network service for the UAV, such that the base station prepare for handover between base stations in advance according to the flight path information.

At step 620, the flight path information is transmitted to the base station that provides the network service for the controlled UAV, such that the base station determines the flight path according to the flight path information.

In the above example, by setting the flight path information, wherein the flight path information represents the flight path set by the UAV controller for the UAV controlled thereby, and transmitting the flight path information to the base station that provides the network service for the controlled UAV, the base station may determine the flight path of the UAV according to the flight path information, and may also determine the next base station to which the UAV is to move according to the flight path, and perform the handover preparation for the next base station, thereby improving the mobility of the UAV and further reducing the latency of base station handover.

In an example, the flight path information at the step 620 may further include an identifier of the UAV controlled by the UAV controller.

In the above example, by adding the identifier of the UAV controlled by the UAV controller to the flight path information, a current base station may directly obtain, from the flight path information, which UAV the flight path is directed to, and which base station(s) the UAV may pass, thereby improving the speed at which the current base station acquires the flight path of the UAV, and further increasing the control efficiency of the UAV.

Figure 7:
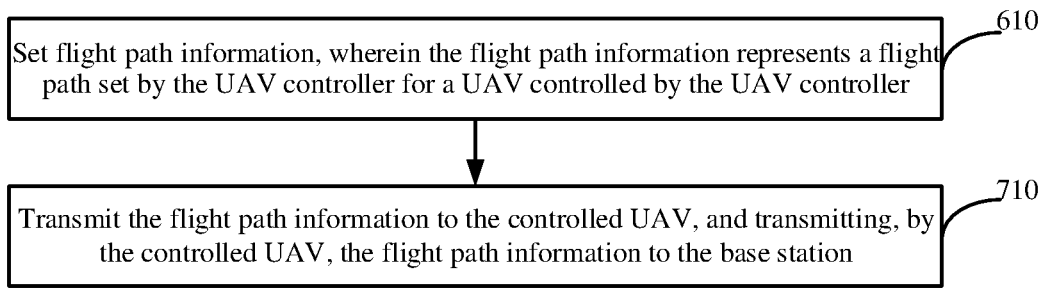
FIG. 7 is a flow chart illustrating another method of controlling a UAV according to an example of the present disclosure.

FIG. 7 is a flow chart illustrating a method of controlling a UAV according to an example of the present disclosure. The method of controlling the UAV may be applied to a UAV controller. On the basis of the method shown in FIG. 6, when performing the step 620, the method may include the following step 710 shown in FIG. 7.

At step 710, the flight path information is transmitted to the controlled UAV, and the flight path information is transmitted to the base station by the controlled UAV.

In the above example, by transmitting the flight path information to the controlled UAV, and by the controlled UAV transmitting the flight path information to the base station, the transmission manner of the flight path information is enriched, and information transmission efficiency is improved.

In an example, the step 620 or the step 710 may adopt, but is not limited to, the following manner:

transmitting the flight path information to the base station through an RRC signaling.

In an implementation, the UAV controller may add the flight path information to the first RRC signaling, and then transmit the first RRC signaling with the flight path information to the base station, such that the base station acquires the flight path information from the first RRC signaling.

In another implementation, the UAV controller may transmit the flight path information to the UAV, and the UAV adds the flight path information to the second RRC signaling, then the UAV transmits the second RRC signaling with the flight path information to the base station, such that the base station acquires the flight path information from the second RRC signaling.

In the above example, by transmitting the flight path information to the base station through the RRC signaling, the base station may accurately acquire the flight path information from the RRC signaling, thereby improving the reliability of information transmission.

Figure 8:
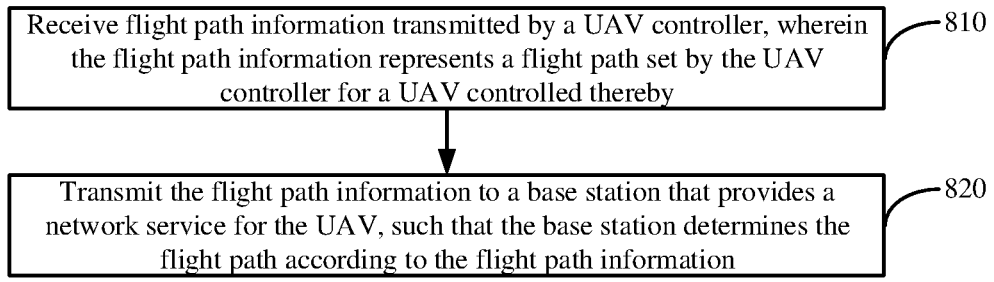
FIG. 8 is a flow chart illustrating a method of controlling a UAV according to an example of the present disclosure.

FIG. 8 is a flow chart illustrating a method of controlling a UAV according to an example of the present disclosure. The method of controlling the UAV may be applied to the UAV. The method of controlling the UAV may include the following steps 810-820 shown in FIG. 8.

At step 810, flight path information transmitted by a UAV controller is received. The flight path information represents a flight path set by the UAV controller for a UAV controlled thereby.

At step 820, the flight path information is transmitted to a base station that provides a network service for the UAV, such that the base station determines the flight path according to the flight path information.

In the above example, the flight path information from the UAV controller is received and the flight path information is transmitted to the base station that provides the network service for the UAV, such that the base station determines the flight path according to the flight path information. As such, the base station determines the next base station to which the UAV is to move according to the flight path information, and performs the handover preparation for the next base station, thereby improving the mobility of the UAV and further reducing the latency of base station handover.

In an example, the flight path information at the step 820 may further include an identifier of the UAV controlled by the UAV controller.

In this way, when the flight path information includes the identifier of the UAV controlled by the UAV controller, a current base station may directly obtain, from the flight path information, which UAV the flight path is directed to, and which base station(s) the UAV may pass, thereby improving the speed at which the current base station acquires the flight path of the UAV, and also increasing the control efficiency of the UAV.

In the above example, by adding the identifier of the UAV controlled by the UAV controller to the flight path information, the current base station may directly obtain, from the flight path information, which UAV the flight path is directed to, and which base station(s) the UAV may pass, thereby improving the speed at which the current base station acquires the flight path of the UAV, and also increasing the control efficiency of the UAV.

Figure 9:
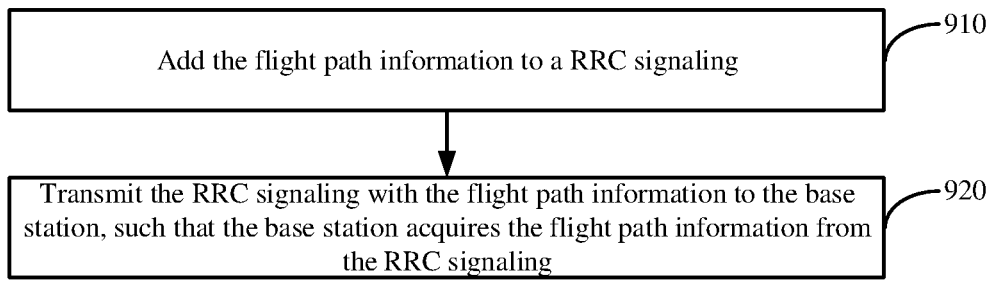
FIG. 9 is a flow chart illustrating another method of controlling a UAV according to an example of the present disclosure.

FIG. 9 is a flow chart illustrating a method of controlling a UAV according to an example of the present disclosure. The method of controlling the UAV may be applied to a UAV. On the basis of the method shown in FIG. 8, when performing the step 820, the method may include the following steps 910-920 shown in FIG. 9.

At step 910, the flight path information is added to the RRC signaling.

At step 920, the RRC signaling with the flight path information is transmitted to the base station, such that the base station acquires the flight path information from the RRC signaling.

In the above example, the flight path information is added to the RRC signaling and the RRC signaling with the flight path information is transmitted to the base station such that the base station acquires the flight path information from the RRC signaling. As a result, the base station may accurately acquire the flight path information from the RRC signaling, thereby improving the reliability of information transmission.

Corresponding to the method examples of controlling a UAV, the present disclosure also provides apparatus examples for controlling the UAV.

Figure 10:
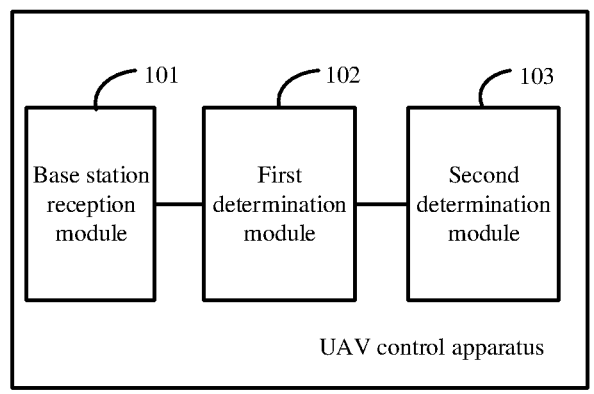
FIG. 10 is a block diagram illustrating an apparatus for controlling a UAV according to an example of the present disclosure.

FIG. 10 is a block diagram illustrating an apparatus for controlling a UAV according to an example of the present disclosure. The apparatus is applied to a base station, and is configured to execute the method of controlling the UAV shown in FIG. 1. The apparatus for controlling the UAV may include a base station reception module 101, a first determination module 102 and a second determination module 103 shown in FIG. 10.

The base station reception module 101 is configured to receive flight path information transmitted by a UAV controller, wherein the flight path information represents a flight path set by the UAV controller for a UAV controlled by the UAV controller.

The first determination module 102 is configured to determine the flight path according to the flight path information.

The second determination module 103 is configured to determine a next base station to which the UAV is to move according to the flight path, and perform a handover preparation for the next base station.

In the above example, the flight path information transmitted by the UAV controller is received, the flight path set by the UAV controller for the UAV controlled thereby is determined according to the flight path information, the next base station to which the UAV is to move is determined according to the flight path, and the handover preparation is performed for the next base station. As a result, the mobility of the UAV is improved and further the latency of base station handover is reduced.

In an example, on the basis of the apparatus shown in FIG. 10, the flight path information further includes an identifier of the UAV controlled by the UAV controller.

In the above example, when the flight path information may further include the identifier of the UAV controlled by the UAV controller, the current base station may directly obtain, from the flight path information, which UAV the flight path is directed to, and which base stations the UAV may pass, thereby improving the speed at which the current base station acquires the flight path of the UAV, and also increasing the control efficiency of the UAV.

Figure 11:
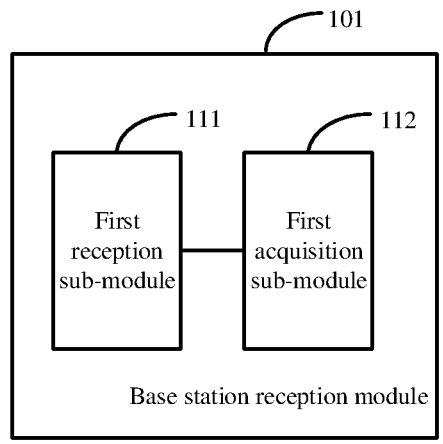
FIG. 11 is a block diagram illustrating another apparatus for controlling a UAV according to an example of the present disclosure.

In an example, on the basis of the apparatus shown in FIG. 10, the base station reception module 101 may include a first reception sub-module 111 and a first acquisition sub-module 112 shown in FIG. 11.

The first reception sub-module 111 is configured to receive a first radio resource control (RRC) signaling transmitted by the UAV controller, wherein the first RRC signaling includes the flight path information.

The first acquisition sub-module 112 is configured to acquire the flight path information from the first RRC signaling.

In the above example, the first RRC signaling transmitted by the UAV controller is received, and the flight path information from the first RRC signaling is acquired. As such, the base station determines the next base station to which the UAV is to move according to the flight path information, and performs the handover preparation for the next base station, thereby improving the mobility of the UAV and further reducing the latency of base station handover.

Figure 12:
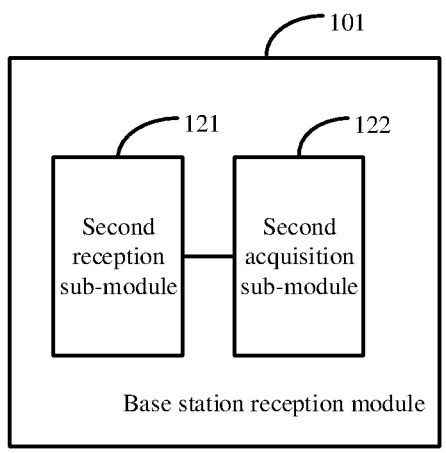
FIG. 12 is a block diagram illustrating another apparatus for controlling a UAV according to an example of the present disclosure.

In an example, on the basis of the apparatus shown in FIG. 10, the base station reception module 101 may include a second reception sub-module 121 and a second acquisition sub-module 122 shown in FIG. 12.

The second reception sub-module 121 is configured to receive a second RRC signaling transmitted by the UAV controlled by the UAV controller, wherein the second RRC signaling includes the flight path information.

The second acquisition sub-module 122 is configured to acquire the flight path information from the second RRC signaling.

In the above example, the second RRC signaling from the UAV controlled by the UAV controller is received, and the flight path information is acquired from the second RRC signaling. As such, the base station determines the next base station to which the UAV is to move according to the flight path information, and performs the handover preparation for the next base station, thereby improving the mobility of the UAV and further reducing the latency of base station handover.

Figure 13:
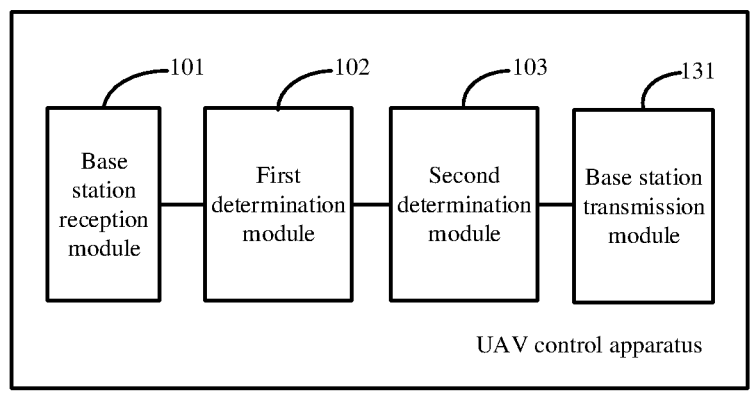
FIG. 13 is a block diagram illustrating another apparatus for controlling a UAV according to an example of the present disclosure.

In an example, on the basis of the apparatus shown in FIG. 10, the apparatus for controlling the UAV may further include a base station transmission module 131 shown in FIG. 13.

The base station transmission module 131 is configured to transmit the flight path information to at least one adjacent base station corresponding to the base station, such that the at least one adjacent base station determines itself as a base station to which the UAV is to move according to the flight path information, then determines another next base station to which the UAV is to move according to the flight path information, and performs a handover preparation for the another next base station.

In the above example, the flight path information is transmitted to the at least one adjacent base station corresponding to the current base station, such that the at least one base station the UAV will pass may prepare for base station handover in advance, thereby improving the mobility of the UAV and further reducing the latency of base station handover.

Figure 14:
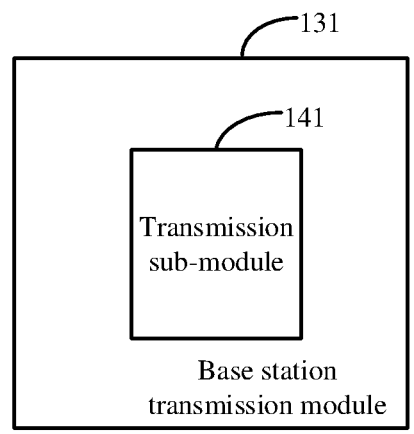
FIG. 14 is a block diagram illustrating another apparatus for controlling a UAV according to an example of the present disclosure.

In an example, on the basis of the apparatus shown in FIG. 13, the base station transmission module 131 may include a transmission sub-module 141 shown in FIG. 14.

The transmission sub-module 141 is configured to transmit the flight path information to the at least one adjacent base station through an X2 interface.

In the above example, the flight path information is transmitted to the at least one adjacent base station corresponding to the base station through an X2 interface, thus the efficiency of information transmission is improved.

Figure 15:
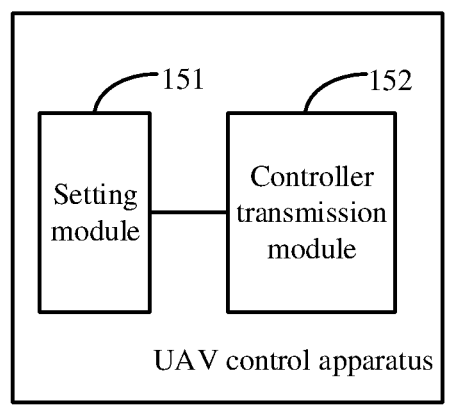
FIG. 15 is a block diagram illustrating an apparatus for controlling a UAV according to an example of the present disclosure.

FIG. 15 is a block diagram illustrating an apparatus for controlling a UAV according to an example of the present disclosure. The apparatus is applied to a UAV controller, and is configured to execute the method of controlling the UAV shown in FIG. 6. The apparatus for controlling the UAV may include a setting module 151 and a controller transmission module 152 shown in FIG. 15.

The setting module 151 is configured to set flight path information, wherein the flight path information represents a flight path set by the UAV controller for a UAV controlled thereby.

The controller transmission module 152 is configured to transmit the flight path information to a base station that provides a network service for the controlled UAV, such that the base station determines the flight path according to the flight path information.

In the above example, by setting the flight path information, wherein the flight path information represents the flight path set by the UAV controller for the UAV controlled thereby, and by transmitting the flight path information to the base station that provides the network service for the controlled UAV, the base station may be configured to determine the flight path of the UAV according to the flight path information, and may be further configured to determine the next base station to which the UAV is to move according to the flight path, and perform the handover preparation for the next base station, thereby improving the mobility of the UAV and further reducing the latency of base station handover.

In an example, on the basis of the apparatus shown in FIG. 15, the flight path information further includes an identifier of the UAV controlled by the UAV controller.

In the above example, the identifier of the UAV controlled by the UAV controller is added to the flight path information, such that the current base station may directly obtain, from the flight path information, which UAV the flight path is directed to, and which base stations the UAV may pass, thereby improving the speed at which the current base station acquires the flight path of the UAV, and further increasing the control efficiency of the UAV.

Figure 16:
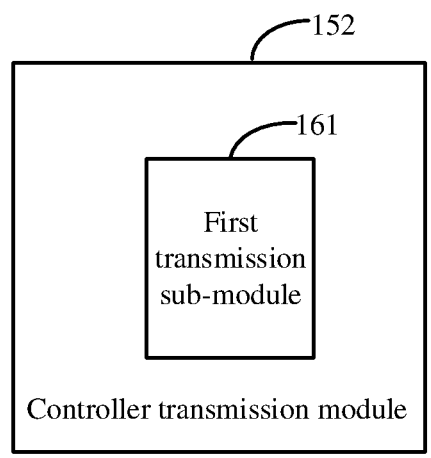
FIG. 16 is a block diagram illustrating another apparatus for controlling a UAV according to an example of the present disclosure.

In an example, on the basis of the apparatus shown in FIG. 15, the controller transmission module 152 may include a first transmission sub-module 161 shown in FIG. 16.

The first transmission sub-module 161 is configured to transmit the flight path information to the controlled UAV, and transmit, by the controlled UAV, the flight path information to the base station.

In the above example, by transmitting the flight path information to the controlled UAV, and transmitting, by the controlled UAV, the flight path information to the base station, the transmission manner of the flight path information is enriched, and information transmission efficiency is improved.

Figure 17:
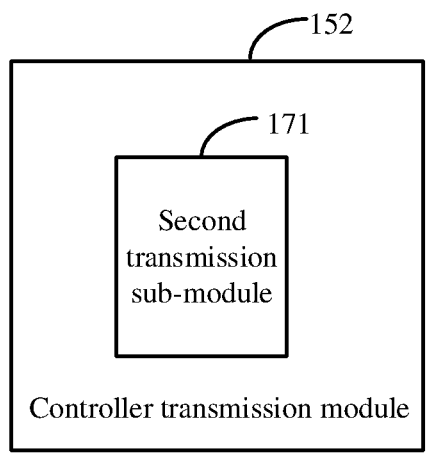
FIG. 17 is a block diagram illustrating another apparatus for controlling a UAV according to an example of the present disclosure.

In an example, on the basis of the apparatus shown in FIG. 15 or 16, the controller transmission module 152 may include a second transmission sub-module 171 shown in FIG. 17.

The second transmission sub-module 171 is configured to transmit the flight path information to the base station through an RRC signaling.

In addition, the first transmission sub-module 161 may further include the second transmission sub-module 171.

In the example, by transmitting the flight path information to the base station through the RRC signaling, the base station may accurately acquire the flight path information from the RRC signaling, thereby improving the reliability of information transmission.

Figure 18:
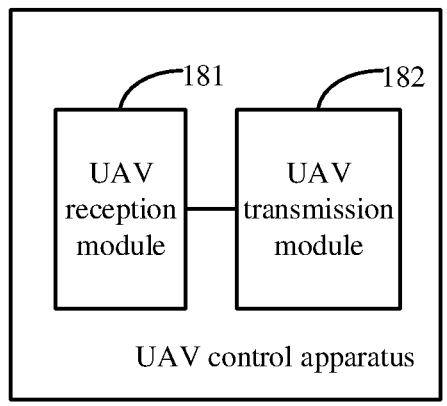
FIG. 18 is a block diagram illustrating an apparatus for controlling a UAV according to an example of the present disclosure.

FIG. 18 is a block diagram illustrating an apparatus for controlling a UAV according to an example of the present disclosure. The apparatus is applied to a UAV, and is configured to execute the method of controlling the UAV shown in FIG. 8. The apparatus for controlling the UAV may include a UAV reception module 181 and a UAV transmission module 182 shown in FIG. 18.

The UAV reception module 181 is configured to receive flight path information transmitted by a UAV controller, wherein the flight path information represents a flight path set by the UAV controller for a UAV controlled thereby.

The UAV transmission module 182 is configured to transmit the flight path information to a base station that provides a network service for the UAV, such that the base station determines the flight path according to the flight path information.

In the above example, the flight path information transmitted by the UAV controller is received and the flight path information is transmitted to the base station that provides the network service for the UAV such that the base station determines the flight path according to the flight path information. As such, the base station determines the next base station to which the UAV is to move according to the flight path information, and performs the handover preparation for the next base station, thereby improving the mobility of the UAV and further reducing the latency of base station handover.

In an example, on the basis of the apparatus shown in FIG. 18, the flight path information further includes an identifier of the UAV controlled by the UAV controller.

In the above example, by adding the identifier of the UAV controlled by the UAV controller to the flight path information, the current base station may directly obtain, from the flight path information, which UAV the flight path is directed to, and which base stations the UAV may pass, thereby improving the speed at which the current base station acquires the flight path of the UAV, and also increasing the control efficiency of the UAV.

Figure 19:
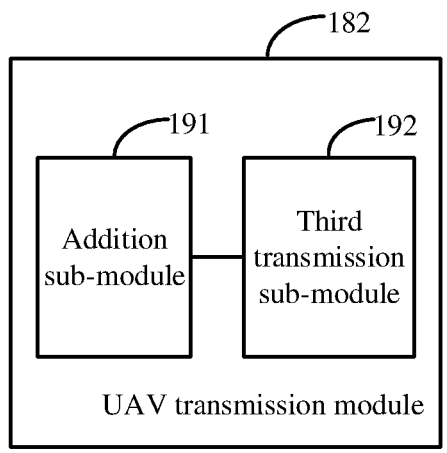
FIG. 19 is a block diagram illustrating another apparatus for controlling a UAV according to an example of the present disclosure.

In an example, on the basis of the apparatus shown in FIG. 18, the UAV transmission module 182 may include an addition sub-module 191 and a third transmission sub-module 192 shown in FIG. 19.

The addition sub-module 191 is configured to add the flight path information to a RRC signaling.

The third transmission sub-module 192 is configured to transmit the RRC signaling with the flight path information to the base station, such that the base station acquires the flight path information from the RRC signaling.

In the above example, the flight path information is added to the RRC signaling and the RRC signaling with the flight path information is transmitted to the base station such that the base station acquires the flight path information from the RRC signaling. As such, the base station may accurately acquire the flight path information from the RRC signaling, thereby improving the reliability of information transmission.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

The present disclosure further provides a non-transitory computer readable storage medium having a computer program stored thereon, wherein the computer program is configured to execute a method of controlling the UAV shown in FIGS. 1 to 5.

The present disclosure further provides a non-transitory computer readable storage medium having a computer program stored thereon, wherein the computer program is configured to execute a method of controlling the UAV shown in FIGS. 6 to 7.

The present disclosure further provides a non-transitory computer readable storage medium having a computer program stored thereon, wherein the computer program is configured to execute a method of controlling the UAV shown in FIGS. 8 to 9.

The present disclosure further provides an apparatus for controlling a UAV. The apparatus is applied to a base station. The apparatus includes:
 a processor; and
 a memory for storing processor executable instructions, wherein the processor is configured to:
 receive flight path information transmitted by a UAV controller, wherein the flight path information represents a flight path set by the UAV controller for a UAV controlled thereby;
 determine the flight path according to the flight path information;
 determine a next base station to which the UAV is to move according to the flight path, and perform a handover preparation for the next base station.

Figure 20:
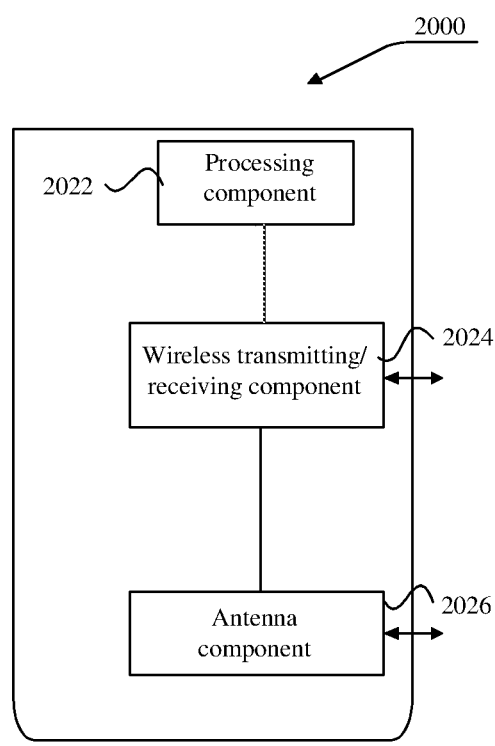
FIG. 20 is a schematic structural diagram illustrating an apparatus for controlling a UAV according to an example of the present disclosure.

FIG. 20 is a schematic structural diagram illustrating an apparatus for controlling a UAV according to an example of the present disclosure. The apparatus 2000 may be provided as a base station. Referring to FIG. 20, the apparatus 2000 includes a processing component 2022, a wireless transmitting/receiving component 2024, an antenna component 2026, and a signal processing portion specific to a wireless interface. The processing component 2022 may further include one or more processors.

One of the processors in the processing component 2022 may be configured to execute any of the methods of controlling the UAV as described above.

The present disclosure further provides an apparatus for controlling a UAV. the apparatus is applied to a UAV controller, and the apparatus includes:
 a processor;
 a memory for storing processor executable instructions, wherein the processor is configured to:
 set flight path information, wherein the flight path information represents a flight path set by the UAV controller for a UAV controlled by the UAV controller;
 transmit the flight path information to a base station that provides a network service for the controlled UAV, such that the base station determines the flight path according to the flight path information.

Figure 21:
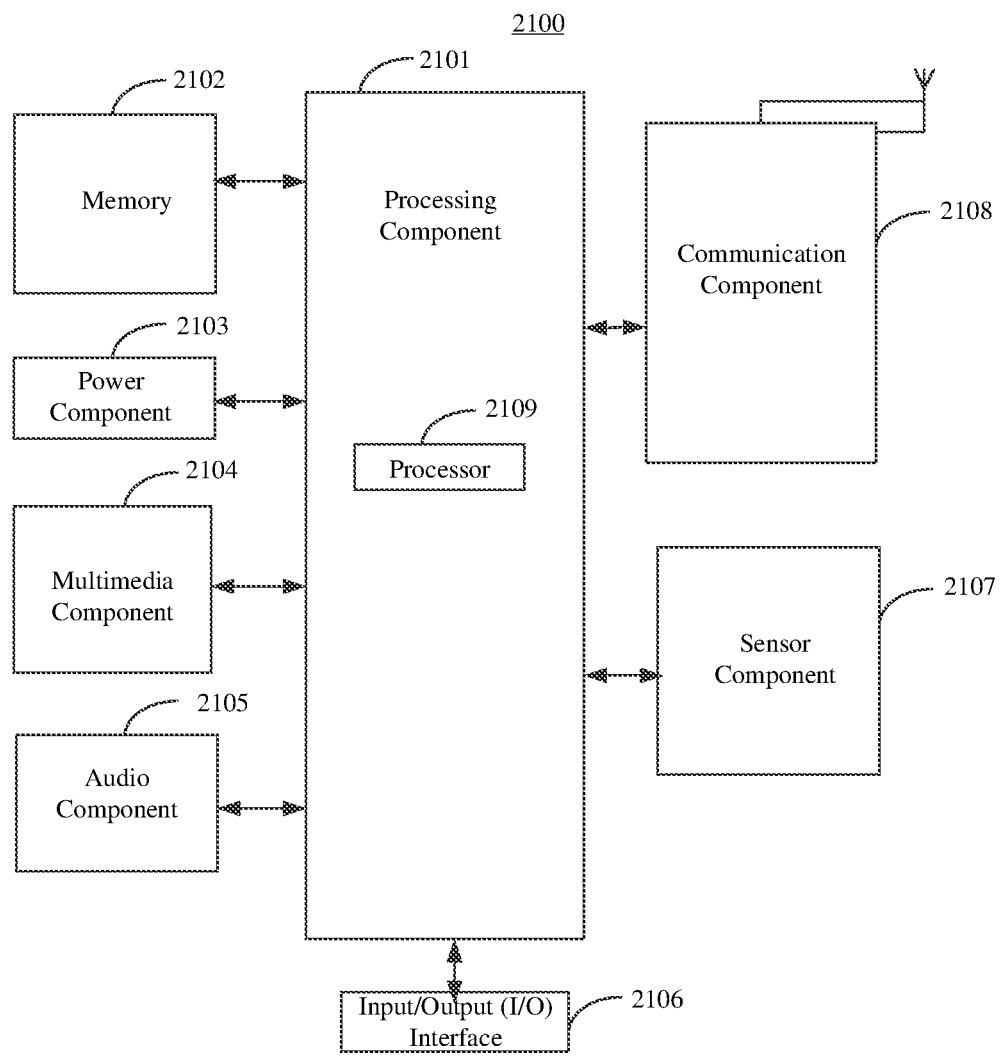
FIG. 21 is a schematic structural diagram illustrating an apparatus for controlling a UAV according to an example of the present disclosure.

FIG. 21 is a schematic structural diagram illustrating an apparatus for controlling a UAV according to an example of the present disclosure. As shown in FIG. 21, a UAV control apparatus 2100 is shown according to an example of the present disclosure. The apparatus 2100 may be a computer, a mobile phone, a digital broadcast terminal, a messaging device, a game console, a tablet device, a medical equipment, a fitness equipment, a personal digital assistant, a UAV controller, etc.

Referring to FIG. 21, the apparatus 2100 may include one or more of the following components: a processing component 2101, a memory 2102, a power component 2103, a multimedia component 2104, an audio component 2105, an input/output (I/O) interface 2106, a sensor component 2107, and a communication component 2108.

The processing component 2101 usually controls the overall operation of the apparatus 2100, such as operations associated with display, telephone calls, data communications, camera operations, and recording operations. The processing component 2101 may include one or more processors 2109 to execute instructions to perform all or part of the steps in the methods described above. Moreover, the processing component 2101 may include one or more modules to facilitate interaction between the processing component 2101 and other components. For example, the processing component 2101 may include a multimedia module to facilitate interaction between the multimedia component 2104 and the processing component 2101.

The memory 2102 is configured to store various types of data to support operation at the apparatus 2100. Examples of these data include instructions for any application or method operating at the apparatus 2100, contact data, phone book data, messages, pictures, videos, and the like. The memory 2102 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 2103 provides power for various components of the apparatus 2100. The power component 2103 may include a power management system, one or more power sources, and other components associated with power generated, managed, and distributed for the apparatus 2100.

The multimedia component 2104 includes a screen that provides an output interface between the apparatus 2100 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2104 includes a front camera and/or a rear camera. When the apparatus 2100 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2105 is configured to output and/or input audio signals. For example, the audio component 2105 includes a microphone (MIC) configured to receive an external audio signal when the apparatus 2100 is in an operation mode, such as a call mode, a recording mode, and a voice recognition mode. The received audio signal may be further stored in the memory 2102 or transmitted via the communication component 2108. In some examples, the audio component 2105 also includes a loudspeaker for outputting an audio signal.

The I/O interface 2106 provides an interface between the processing component 2101 and a peripheral interface module which may be a keyboard, a click wheel, a button, or the like. These buttons may include, but are not limited to a home button, a volume button, a start button, and a lock button.

The sensor component 2107 includes one or more sensors for providing a status assessment in various aspects to the apparatus 2100. For example, the sensor component 2107 may be configured to detect an open/closed state of the apparatus 2100, and the relative positioning of components, for example, the component is a display and a keypad of the apparatus 2100. The sensor component 2107 may be configured to detect a change in position of the apparatus 2100 or a component of the apparatus 2100, the presence or absence of a user in contact with the apparatus 2100, the orientation or acceleration/deceleration of the apparatus 2100 and a change in temperature of the apparatus 2100. The sensor component 2107 may include a proximity sensor configured to detect the presence of nearby objects without any physical contact. The sensor component 2107 may further include a light sensor, such as a CMOS or CCD image sensor, for use in imaging applications. In some examples, the sensor component 2107 may further include an acceleration sensor, a gyro sensor, a magnetic sensor, a pressure sensor, or a temperature sensor.

The communication component 2108 is configured to facilitate wired or wireless communication between the apparatus 2100 and other devices. The apparatus 2100 may access a wireless network based on a communication standard, such as WiFi, 2G or 3G, or a combination thereof. In an example, the communication component 2108 receives broadcast signals or broadcast associated information from an external broadcast management system via a broadcast channel In an example, the communication component 2108 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 2100 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 2102 including instructions, wherein the instructions are executable by the processor 2109 of the apparatus 2100 to perform the method as described above. For example, the non-transitory computer readable storage medium may be a ROM, a random access memory (RAM), a CD-ROM, a magnetic tape, a floppy disk, and an optical data storage device. The instructions in the storage medium, when being executed by the processor, cause the apparatus 2100 to execute any of the UAV control methods as described above.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. An apparatus for controlling an unmanned aerial vehicle (UAV), being applied to a base station, and comprising:
　　a processor; and
　　a memory storing instructions executable by the processor;
　　wherein the processor is configured to:
　　　　acquire flight path information, wherein the flight path information represents a flight path set by a UAV controller for the UAV controlled by the UAV controller;
　　　　determine the flight path based on the flight path information; and determine a next base station to which the UAV is to move based on the flight path, and perform a handover preparation for the next base station, wherein the processor is further configured to:
acquire the flight path information from a first radio resource control (RRC) signaling transmitted by the UAV controller after establishing an RRC connection with the UAV controller, wherein the first RRC signaling comprises user equipment assistance information; or acquire the flight path information from a second RRC signaling transmitted by the UAV after establishing the RRC connection with the UAV controlled by the UAV controller, wherein the second RRC signaling comprises the user equipment assistance information;

wherein the processor is further configured to:
transmit the flight path information to at least one adjacent base station corresponding to the base station through an X2 interface, such that the at least one adjacent base station determines itself as a base station to which the UAV is to move based on the flight path information, then determines another next base station to which the UAV is to move based on the flight path information, and performs a handover preparation for the another next base station.

2. The apparatus according to claim 1, wherein the flight path information further comprises an identifier of the UAV controlled by the UAV controller.

3. An apparatus for controlling an unmanned aerial vehicle (UAV), being applied to a UAV controller, and comprising:
a processor; and
a memory storing instructions executable by the processor;
wherein the processor is configured to:
set flight path information, wherein the flight path information represents a flight path set by the UAV controller for the UAV controlled by the UAV controller; and
transmit the flight path information to a base station that provides a network service for the controlled UAV, such that the base station determines the flight path based on the flight path information, wherein the processor is further configured to:
transmit the flight path information to the controlled UAV, such that the controlled UAV transmits the flight path information to the base station; or
transmit the flight path information to the base station through a first radio resource control (RRC) signaling after establishing an RRC connection with the base station, such that the base station acquires the flight path information from the first RRC signaling, wherein the first RRC signaling comprises user equipment assistance information.

4. The apparatus according to claim 3, wherein the flight path information further comprises an identifier of the UAV controlled by the UAV controller.

5. An apparatus for controlling an unmanned aerial vehicle (UAV), being applied to the UAV, and comprising:
a processor; and
a memory storing instructions executable by the processor;
wherein the processor is configured to:
receive flight path information transmitted by a UAV controller, wherein the flight path information represents a flight path set by the UAV controller for the UAV controlled by the UAV controller; and
transmit the flight path information to a base station that provides a network service for the UAV, such that the base station determines the flight path based on the flight path information, wherein the processor is further configured to:
add the flight path information to a radio resource control (RRC) signaling after establishing an RRC connection with the base station, wherein the RRC signaling comprises user equipment assistance information; and
transmit the RRC signaling with the flight path information to the base station, such that the base station acquires the flight path information from the RRC signaling.

6. The apparatus according to claim 5, wherein the flight path information further comprises an identifier of the UAV controlled by the UAV controller.

* * * * *